US007706159B2

(12) United States Patent
Kim et al.

(10) Patent No.: US 7,706,159 B2
(45) Date of Patent: Apr. 27, 2010

(54) CHARGE PUMP, DC-DC CONVERTER, AND METHOD THEREOF

(75) Inventors: Tae-Whan Kim, Seoul (KR); Kae-Dal Kwack, Seoul (KR); Hong-Jae Shin, Seoul (KR)

(73) Assignee: Samsung Electronics Co., Ltd. (KR)

( * ) Notice: Subject to any disclaimer, the term of this patent is extended or adjusted under 35 U.S.C. 154(b) by 853 days.

(21) Appl. No.: 11/442,451

(22) Filed: May 26, 2006

(65) Prior Publication Data

US 2006/0279352 A1 Dec. 14, 2006

(30) Foreign Application Priority Data

May 27, 2005 (KR) ..................... 10-2005-0044960

(51) Int. Cl.
*G05F 1/10* (2006.01)

(52) U.S. Cl. ........................... 363/59; 327/60; 327/537

(58) Field of Classification Search .................. 327/60, 327/536, 537, 59; 363/59, 60
See application file for complete search history.

(56) References Cited

U.S. PATENT DOCUMENTS

| | | | | |
|---|---|---|---|---|
| 5,422,590 | A * | 6/1995 | Coffman et al. | 327/537 |
| 2002/0130704 | A1 * | 9/2002 | Myono et al. | 327/536 |
| 2006/0255853 | A1 * | 11/2006 | Masuko et al. | 327/536 |

* cited by examiner

*Primary Examiner*—Michael B Shingleton
(74) *Attorney, Agent, or Firm*—Cantor Colburn LLP

(57) ABSTRACT

A charge pump for a DC-DC converter includes an input terminal receiving an input voltage, an output terminal outputting an output voltage, a plurality of charge pumping stages connected in series between the input terminal and the output terminal, and a voltage level shifter shifting voltage levels of first and second gate clock signals so that received first and second gate clock signals have a predetermined amplitude. Therefore, the charge pump can increase power efficiency by maximizing a magnitude of $V_{GS}$. A DC-DC converter using the charge pump can also be applied to a portable device, for minimizing power consumption, and a method for improving power efficiency of the DC-DC converter is provided.

15 Claims, 7 Drawing Sheets

310
420
GCLK
GCLKB
voltage level shifter
430
GCLK'
GCLKB'
GCLKB'
C1
C2
C6
G1
G2
G6
GP1
GP2
GP6
400
410
$V_{IN}$
N1
N2
MP1
MP2
MP6
$V_{OUT}$
CP1
CP2
CP5
$C_{LOAD}$
436
431
432
CLK
CLKB
CLK

CHARGE PUMP, DC-DC CONVERTER, AND METHOD THEREOF

This application claims priority to Korean Patent Application No. 10-2005-0044960, filed on May 27, 2005, and all the benefits accruing therefrom under 35 U.S.C. §119, and the contents of which in its entirety are herein incorporated by reference.

BACKGROUND OF THE INVENTION (a) Field of the Invention

The present invention relates to a charge pump, a DC-DC converter, and a method thereof. More particularly, the present invention relates to a high efficiency charge pump, a DC-DC converter including the charge pump, and a method of improving power efficiency of the DC-DC converter.

(b) Description of the Related Art

A digital circuit within a driving chip of a flat panel display is a low voltage circuit that operates with a voltage of about 3V, which is a supply voltage of a chip. However, an analog output stage of a scan driving circuit and a data driving circuit for driving a panel of an organic light emitting device ("OLED") is composed of a high voltage circuit. A voltage of about 10 to 20V is applied, depending on characteristics of the display panel. Therefore, a DC-DC converter, which receives a supply source voltage of about 3V and generates a high voltage required for output stages of the data driving circuit and the scan driving circuit, is required. Specifically, the DC-DC converter requires low-power and high efficiency of design technology because it is used in a portable instrument.

The DC-DC converter may be divided into a switching type and a charge pump type. A charge pump type of DC-DC converter having high power efficiency is generally used in a display device for a portable instrument.

However, when the charge pump type is used, a voltage drop is generated due to a threshold voltage of charge transfer transistors constituting the charge pump. Accordingly, in a structure in which power consumption is generated and a high voltage and a high current are output, there is a problem that power loss is further increased and thus efficiency is reduced.

BRIEF SUMMARY OF THE INVENTION

The present invention provides a high efficiency charge pump that can minimize power loss of a charge transfer transistor within the charge pump.

The present invention also provides a low-power DC-DC converter that can be applied in a display device that uses an organic light emitting device ("OLED") by using a high efficiency charge pump.

The present invention also provides a low-power DC-DC converter that can be applied in a mobile display device.

According to exemplary embodiments of the present invention, there is provided a charge pump including an input terminal receiving an input voltage, an output terminal outputting an output voltage, a voltage level shifter shifting voltage levels of first and second gate clock signals so that received first and second gate clock signals output from the voltage level shifter have a predetermined amplitude, and a plurality of charge pumping stages connected in series between the input terminal and the output terminal. Each charge pumping stage includes a charge transfer transistor transferring a voltage input to a first terminal to a second terminal, applying one of the first and second gate clock signals output from the voltage level shifter to a first gate terminal, and a level of a voltage transferred to the second terminal is a maximum level of the first and second gate clock signals output from the voltage level shifter.

Odd-numbered charge pumping stages among the charge pumping stages may be operated by responding to the first gate clock signal output from the voltage level shifter, and even-numbered charge pumping stages may be operated by responding to the second gate clock signal output from the voltage level shifter. Each charge pumping stage may include a swing transistor including a second gate terminal connected to the first terminal of the charge transfer transistor, a third terminal of the swing transistor connected to the second terminal of the charge transfer transistor, and a fourth terminal of the swing transistor connected to the first gate terminal of the charge transfer transistor, a pumping capacitor connected between the second terminal of the charge transfer transistor and one of first and second pumping clock signals in a complementary state, and a swing capacitor connected between the first gate terminal of the charge transfer transistor and one of the first and second gate clock signals output from the voltage level shifter and having the predetermined amplitude.

The charge transfer transistor and the swing transistor may be p-type metal oxide semiconductor ("PMOS") transistors, the first pumping clock signal and the first gate clock signal may correspond to each other and be applied to a same charge pumping stage, a low period of the first gate clock signal may be within a low period of the first pumping clock signal, the second pumping clock signal and the second gate clock signal may correspond to each other and be applied to a same charge pumping stage, and a low period of the second gate clock signal may be within a low period of the second pumping clock signal.

The voltage level shifter may receive the output voltage from the output terminal of the charge pump and shift a voltage level so that amplitudes of the first and second gate clock signals become a magnitude of the output voltage.

A maximum value of a voltage applied to the first gate terminal of the charge transfer transistor may drop to a minimum value of a voltage applied to the first gate terminal of the charge transfer transistor when one of the first and second gate clock signals output from the voltage level shifter is inverted from a high level to a low level. A swing width, defined by a difference between the maximum value and the minimum value of a voltage applied to the first gate terminal of the charge transfer transistor, may be uniform for each charge pumping stage. The swing width may be substantially equal to a magnitude of the output voltage. The plurality of charge pumping stages may include n charge pumping stages, and the swing width may be substantially equal to n times the input voltage, and the output voltage may be equal to n times the input voltage.

According to other exemplary embodiments of the present invention, there is provided a DC-DC converter including a charge pump, a signal generator generating first and second pumping clock signals and first and second gate clock signals, and a signal driver driving a swing transistor and a pumping capacitor of the charge pump connected thereto by using the first and second pumping clock signals and the first and second gate clock signals. The charge pump includes an input terminal receiving an input voltage, an output terminal outputting an output voltage, a voltage level shifter shifting voltage levels of the first and second gate clock signals so that received first and second gate clock signals output from the voltage level shifter have a predetermined amplitude, and a plurality of charge pumping stages connected in series between the input terminal and the output terminal. Each charge pumping stage includes a charge transfer transistor transferring a voltage input to a first terminal to a second terminal and applying one of the first and second gate clock signals output from the voltage level shifter to a first gate terminal, and a maximum level of the first and second gate clock signals output from the voltage level shifter is a level of a voltage that is transferred to the second terminal of the charge transfer transistor.

The DC-DC converter may further include a voltage level detector outputting an enable signal to operate the signal generator when the output voltage does not reach a predetermined magnitude, and for outputting a disable signal to not operate the signal generator when the output voltage reaches the predetermined magnitude.

Odd-numbered charge pumping stages among the charge pumping stages may be operated by responding to the first gate clock signal output from the voltage level shifter, and even-numbered charge pumping stages may be operated by responding to the second gate clock signal output from the voltage level shifter. The charge transfer transistor and the swing transistor may be PMOS transistors. The first pumping clock signal and the first gate clock signal may correspond to each other and be applied to a same charge pumping stage, a low period of the first gate clock signal may be within a low period of the first pumping clock signal, the second pumping clock signal and the second gate clock signal may correspond to each other and be applied to a same pumping stage, and a low period of the second gate clock signal may be within a low period of the second pumping clock signal.

The voltage level shifter may receive the output voltage from the output terminal of the charge pump and shift a voltage level so that amplitudes of the first and second gate clock signals become a magnitude of the output voltage.

A swing width, defined by a difference between a maximum value and a minimum value of a voltage applied to the first gate terminal of the charge transfer transistor, may be uniform for each charge pumping stage.

According to other exemplary embodiments of the present invention, there is provided a method of improving power efficiency of a DC-DC converter, the method including shifting a voltage level of gate clock signals received in a voltage level shifter to have amplitudes equal to a magnitude of an output voltage of a charge pump in the DC-DC converter, and outputting shifted gate clock signals from the voltage level shifter to the charge pump.

The method further includes providing a plurality of charge pump stages within the charge pump, each charge pump stage having a charge transfer transistor having a gate terminal, wherein a swing width of a voltage applied to the gate terminal is uniform for each charge pump stage.

BRIEF DESCRIPTION OF THE DRAWINGS

The above and other features and advantages of the present invention will become more apparent by describing exemplary embodiments thereof with reference to the accompanying drawings, in which.

DETAILED DESCRIPTION OF THE INVENTION

Figure 1:
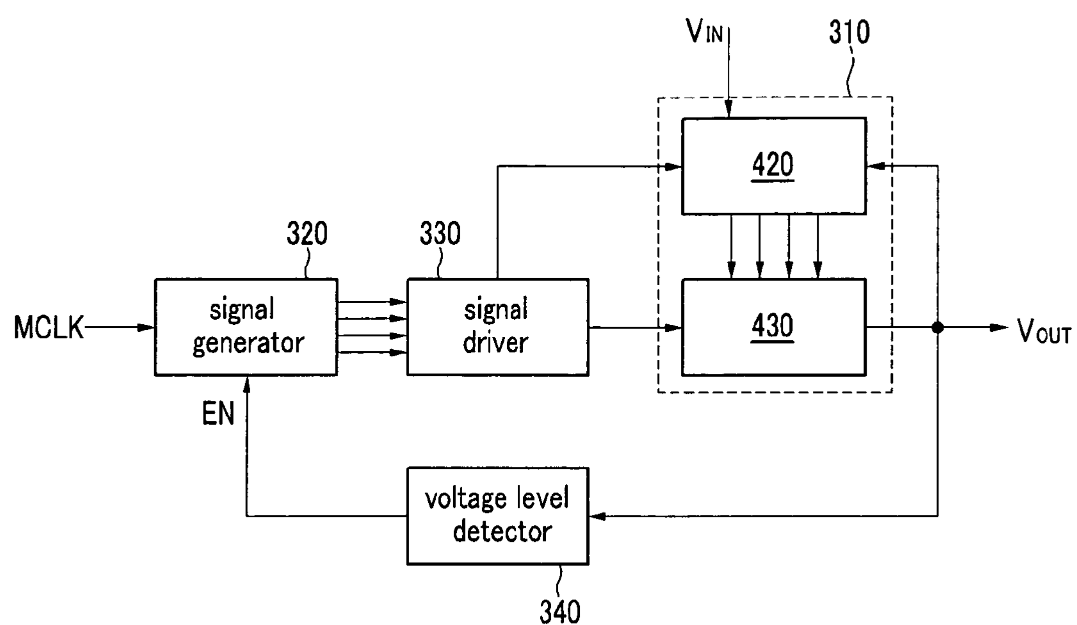
FIG. 1 is a block diagram schematically illustrating an exemplary embodiment of a DC-DC converter according to the present invention.

Exemplary embodiments of the present invention will hereinafter be described with reference to the accompanying drawings.

This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Other features and advantages of the present invention will become more readily apparent from the detailed description and exemplary embodiments given hereinafter in association with the attached drawings.

Hereinafter, exemplary embodiments of a charge pump according to the present invention and a low-power DC-DC converter using the same will be described in detail with reference to the accompanying drawings. Like reference numerals designate like elements, and thus duplicate descriptions thereof will be omitted.

Figure 2:
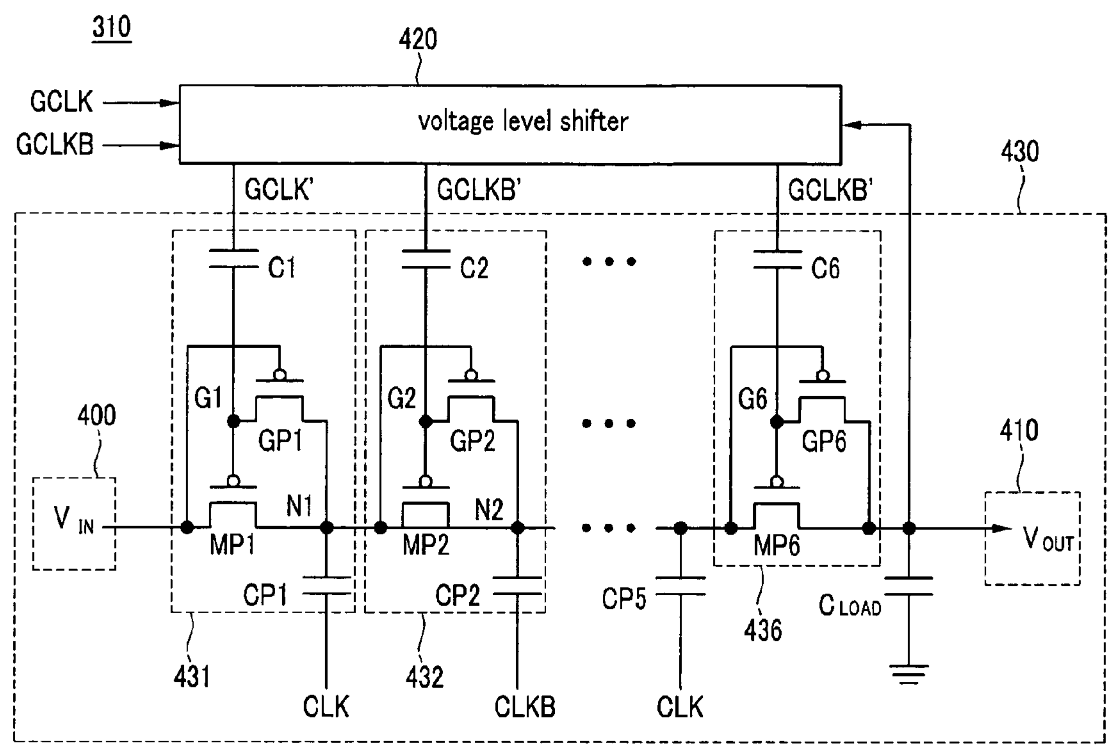
FIG. 2 is a circuit diagram illustrating an exemplary embodiment of a configuration of a charge pump unit according to the present invention.
Figure 3:
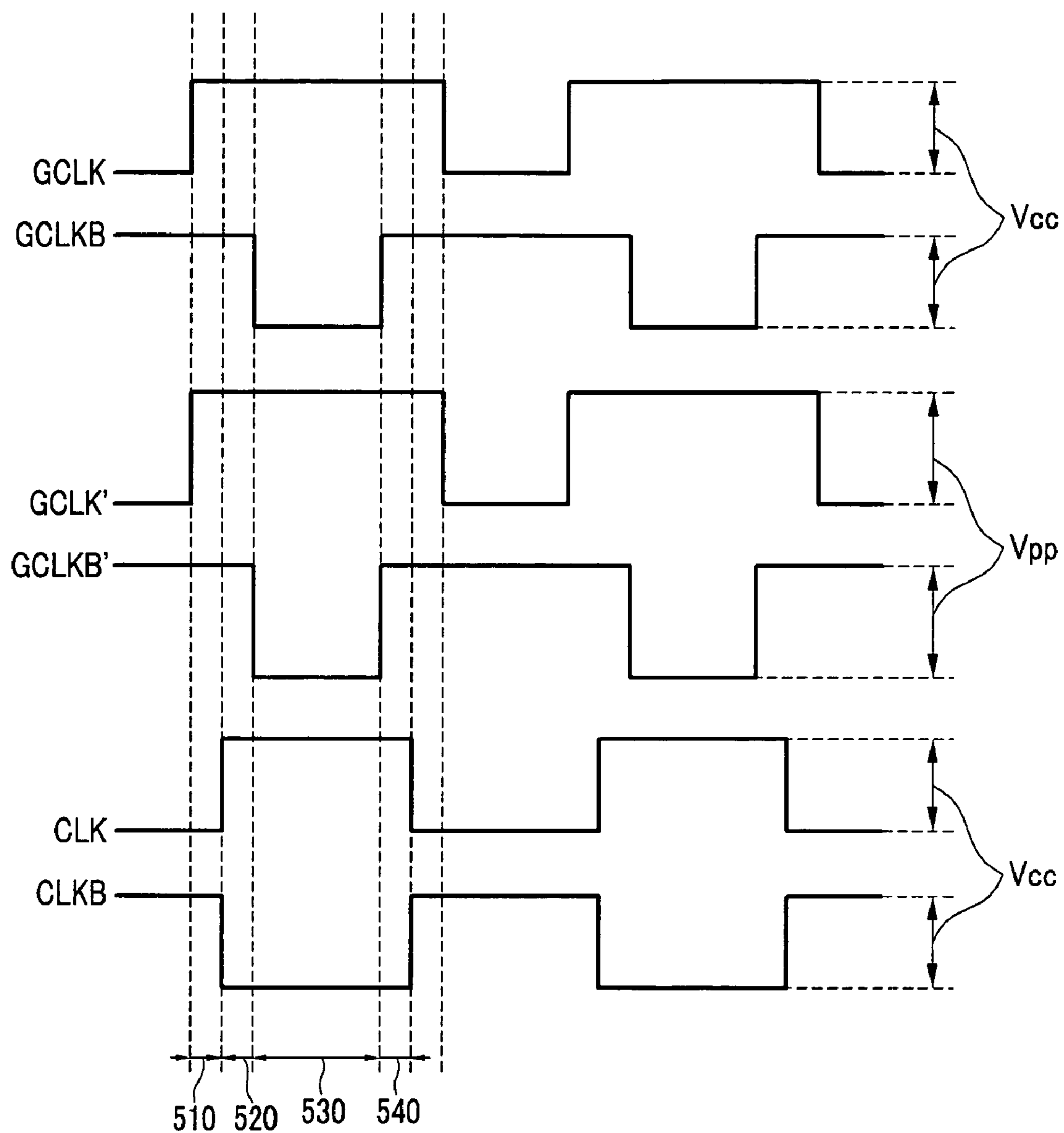
FIG. 3 is a diagram illustrating an exemplary embodiment of the timing of clock signals according to the present invention.

FIG. 1 is a block diagram for schematically illustrating an exemplary embodiment of a DC-DC converter according to the present invention, FIG. 2 is a circuit diagram illustrating an exemplary embodiment of a configuration of a charge pump unit according to the present invention, and FIG. 3 is a diagram illustrating an exemplary embodiment of the timing of clock signals according to the present invention.

Referring to FIG. 1, the DC-DC converter includes a signal generator 320 supplied with a main clock MCLK, a signal driver 330 connected to an output of the signal generator 320, a charge pump unit 310 connected to an output of the signal driver 330 and an input voltage $V_{IN}$, and a voltage level detector 340 connected to an input of the signal generator 320 and an output of the charge pump unit 310. The signal generator 320 generates a plurality of clock signals CLK, CLKB, GCLK, and GCLKB based on the main clock MCLK. The signal driver 330 transmits the clock signals CLK, CLKB, GCLK, GCLKB from the signal generator 320 to the charge pump unit 310.

The charge pump unit 310, as will be further described below with respect to FIG. 2, includes a voltage level shifter 420 and a charge pump 430 connected to the output of the voltage level shifter 420. The charge pump unit 310 outputs an output voltage $V_{OUT}$. The output voltage $V_{OUT}$ is applied to the voltage level shifter 420. The voltage level detector 340 controls the charge pump unit 310 and may include a comparator (not shown).

The operation of the DC-DC converter 300 will now be described.

The signal generator 320 generates pumping clock signals CLK and CLKB and gate clock signals GCLK and GCLKB based on the main clock MCLK and outputs the clock signals CLK, CLKB, GCLK and GCLKB to the signal driver 330.

Referring to FIG. 3, the pumping clock signals CLK and CLKB have a phase difference of 180 degrees and a reverse relationship with respect to each other. The gate clock signals GCLK and GCLKB have a predetermined phase difference that does not overlap each other. Thus, the gate clock signals GCLK and GCLKB do not have a reverse relationship like the pumping clock signals CLK and CLKB.

A period in which the gate clock signal GCLK is a low level occurs within a period in which the pumping clock signal CLK is a low level. A period in which the gate clock signal GCLKB is a low level occurs within a period in which the pumping clock signal CLKB is a low level. A period in which the pumping clock signal CLK is a high level occurs within a period in which the gate clock signal GCLK is a high level. A period in which the pumping clock signal CLKB is a high level occurs within a period in which the gate clock signal GCLKB is a high level.

In exemplary embodiments, the pumping clock signals CLK and CLKB and the gate clock signals GCLK and GCLKB may have the same amplitude. In one exemplary embodiment, the amplitude may be equal to a magnitude Vcc of the input voltage $V_{IN}$.

Referring again to FIG. 1, the signal driver 330 transmits the pumping clock signals CLK and CLKB and the gate clock signals GCLK and GCLKB from the signal generator 320 to the charge pump unit 310.

The voltage level shifter 420 of the charge pump unit 310 varies the amplitude of the gate clock signals GCLK and GCLKB based on the output voltage $V_{OUT}$, to be equal to a magnitude Vpp of the output voltage $V_{OUT}$ and applies the varied gate clock signals GCLK' and GCLKB' to the charge pump 430, where the varied gate clock signals GCLK' and GCLKB' may be hereinafter referred to as the received gate clock signals GCLK' and GCLKB', or simply the gate clock signals GCLK' and GCLKB'.

The charge pump 430 sequentially increases a magnitude of the input voltage $V_{IN}$ to a desired magnitude, based on the varied gate clock signals GCLK' and GCLKB' and the pumping clock signals CLK and CLKB. The charge pump unit 310 will be further described below.

The voltage level detector 340 determines whether or not the magnitude of the output voltage $V_{OUT}$ increases to a predetermined (desired) magnitude, to control the signal generator 320.

When the magnitude of the output voltage $V_{OUT}$ does not reach the desired magnitude, the voltage level detector 340 outputs an enable signal EN having a high level of "1" to the signal generator 320, and thereby the signal generator 320 normally operates. When the magnitude of the output voltage $V_{OUT}$ reaches the desired magnitude, the voltage level detector 340 outputs an enable signal EN having a low level of "0" to the signal generator 320, and thereby disabling the signal generator 320 and interrupting the generation of the clock signals CLK, CLKB, GCLK, and GCLKB. That is, the operation of the charge pump unit 310 is interrupted.

Next, an exemplary embodiment of the charge pump unit according to the present invention will be further described with reference to FIG. 2.

Referring to FIG. 2, the charge pump 430 of the charge pump unit 310 includes an input terminal 400, an output terminal 410, a plurality of charge pump stages, for example first through sixth charge pump stages 431-436, connected between the input terminal 400 and the output terminal 410, and an output capacitor $C_{LOAD}$.

In the exemplary embodiment of FIG. 2, the charge pump 430 includes six charge pump stages 431-436, but there is no particular limit to the number of stages, and therefore an alternate number of stages would be within the scope of these embodiments.

The input terminal 400 receives the input voltage $V_{IN}$ to enable the charge pump unit 310 to function, i.e. pump.

The input voltage $V_{IN}$ is generally set to a voltage (magnitude) Vcc used in driving the charge pump unit 310.

The output terminal 410 outputs the output voltage $V_{OUT}$ that is pumped in a predetermined magnitude through the charge pump stages 431-436 of the charge pump unit 310.

Since the charge pump stages 431-435 have the same construction, excluding the final charge pump stage 436, only the construction the first charge pump stage 431 will be particularly described. The first charge pump stage 431 includes a charge transfer transistor MP1, a swing transistor GP1, a pumping capacitor CP1, and a swing capacitor C1.

In one exemplary embodiment, the charge transfer transistor MP1 and the swing transistor GP1 are p-type metal oxide semiconductor ("PMOS") transistors. The PMOS transistors may be manufactured in a general complementary metal oxide semiconductor ("CMOS") process, but other transistor configurations and methods of manufacture are within the scope of these embodiments.

The charge transfer transistor MP1 is provided with a gate terminal, a drain terminal, and a source terminal.

The swing transistor GP1 is provided with a gate terminal connected to the source terminal of the charge transfer transistor MP1, a source terminal connected to the drain terminal of the charge transfer transistor MP1 and a drain terminal connected to the gate terminal of the charge transfer transistor MP1.

The pumping capacitor CP1 is connected between the pumping clock signal CLK and the drain terminal of the charge transfer transistor MP1.

The swing capacitor C1 is connected between the received gate clock signal GCLK' from the voltage level shifter 420 and the gate terminal of the charge transfer transistor MP1.

The final charge pumping stage 436 may have a construction substantially similar to that of the first pumping stage 431. That is, the final charge pumping stage 436 includes a charge transfer transistor MP6, a swing transistor GP6, and a swing capacitor C6. However, the final charge pumping stage 436 does not have a pumping capacitor.

An operation of the charge pump unit 310 will be hereinafter further described with reference to FIG. 3.

The gate clock signal GCLK' output from the voltage level shifter 420 is applied to the swing capacitors C1, C3, and C5 of the odd-numbered charge pump stages 431, 433, and 435, respectively. The gate clock signal GCLKB' output from the voltage level shifter 420 is applied to the swing capacitors C2, C4, and C6 of the even-numbered charge pump stages 432, 434, and 436, respectively. The pumping clock signal CLK, such as output from the signal driver 330, is applied to the pumping capacitors CP1, CP3, and CP5 of the odd-numbered charge pump stages 431, 433, and 435, respectively. The pumping clock signal CLKB, such as output from the signal driver 330, is applied to the pumping capacitors CP2 and CP4 of the even-numbered charge pump stages 432 and 434. The final charge pump stage, in this example charge pump stage 436, does not receive a pumping clock signal.

Each of the swing capacitors and the pumping capacitors, in which the gate clock signals GCLK' and GCLKB' and the pumping clock signals CLK and CLKB are applied, respectively, may be changed to their counterparts.

As described above, the amplitude of the gate clock signals GCLK' and GCLKB' output from the voltage level shifter 420 may be equal to the magnitude Vpp of the output voltage $V_{OUT}$ and the amplitude of the pumping clock signals CLK and CLKB may be equal to the magnitude Vcc of the input voltage $V_{IN}$.

In one exemplary embodiment, the output voltage $V_{OUT}$ is 6Vcc due to a pumping of 6 charge pump stages. In other words, in the illustrated embodiment, Vpp=6Vcc. For a charge pump 430 having n number of stages, then Vpp=nVcc.

Voltages of nodes N1 to N5 may be defined as Vcc to 5Vcc, respectively, when there is no pumping through the pumping capacitor CP1-CP5. Voltages of nodes N1 to N5 may be defined as 2Vcc to 6Vcc, respectively, when pumping occurs.

Referring to FIG. 3, when the operation of the charge pump unit 310 starts, the gate clock signal GCLK' and the pumping clock signal CLK have a low level, and the gate clock signal GCLKB' and the pumping clock signal CLKB have a high level. Thereby, the charge transfer transistor MP1 is turned-on by the gate clock signal GCLK' applied through the swing capacitor C1 to the gate terminal of the charge transfer transistor MP1, and the swing transistor GP1 is turned-off, to apply the input voltage $V_{IN}$ received by the source terminal of the charge transfer transistor MP1 to the node N1 through the drain terminal of the charge transfer transistor MP1.

Next, in a period 510, the gate clock signals GCLK' and GCLKB', and the pumping clock signal CLKB are a high level and the pumping clock signal CLK is a low level.

Since the gate clock signals GCLK' and GCLKB' are the high level, gate voltages of the charge transfer transistors MP1 to MP6, i.e., voltages $V_{G1}$ to $V_{G6}$ of G1 to G6 nodes, become a high level, and thus the charge transfer transistors MP1-MP6 are turned-off, respectively. Voltages of nodes N1 to N5 are represented by $V_{N1}$ to $V_{N5}$, respectively.

In a period 520, the states of the gate clock signals GCLK' and GCLKB' are the same as those in the period 510, at a high level, and the pumping clock signals CLK and CLKB are inverted so that the pumping clock signal CLK becomes a high level and the pumping clock signal CLKB becomes a low level.

Thereby, an output voltage, i.e., $V_{N1}$ of the first charge pumping stage 431, is pumped by the amplitude of the pumping clock signal CLK to be 2Vcc by a charge voltage of the pumping capacitor CP1.

An output voltage, i.e., $V_{N2}$ of the second pumping stage 432, becomes a value 2Vcc which is not pumped by the pumping clock signal CLKB.

Accordingly, since a source voltage of the source terminal of the swing transistor GP2 connected to the node N2 becomes 2Vcc, and a gate voltage of the gate terminal of the swing transistor GP2 connected to the output voltage $V_{N1}$ becomes 2Vcc, the swing transistor GP2 is turned-on and a voltage $V_{G2}$ of the node G2 becomes 2Vcc, which is the gate voltage for the charge transfer transistor MP2, which is a value of the voltage $V_{N2}$.

In a period 530, levels of the clock signals GCLK', CLK, and CLKB are the same as those in the period 520, that is, clock signals GCLK' and CLK are a high level and CLKB is a low level, and the gate clock signal GCLKB' is inverted to be a low level.

Thereby, a gate voltage, i.e., $V_{G2}$ of the charge transfer transistor MP2 of the second charge pumping stage 432, falls by a width of a final output voltage Vpp (such as 6Vcc) by the gate clock signal GCLKB' received by the swing capacitor C2.

The voltage $V_{G2}$ changes from a value of 2Vcc to −4Vcc. That is, the voltage $V_{G2}$ swings by the amplitude of the gate clock signals GCLK' and GCLKB'. After the swing, since a gate voltage of the transistor MP2 (−4Vcc) is smaller than its source voltage, i.e., the voltage $V_{N1}$ having a value of 2Vcc, the charge transfer transistor MP2 is turned-on and 2Vcc is transferred to the N2 node.

In this case, since the charge transfer transistor MP2 is a P-type transistor, there is no loss due to threshold voltage drop.

In a period 540, when the gate clock signal GCLKB' is inverted to be a high level, the transistor MP2 is turned-off.

When the pumping clock signal CLKB becomes a high level after period 540, a voltage of the node N2 is pumped from 2Vcc to 3Vcc, and as described above, the value 3Vcc is transferred through the charge transfer transistor MP3. By repeating the transferring process for all of the charge pump stages, the final output voltage $V_{OUT}$ is 6Vcc.

Figure 4:
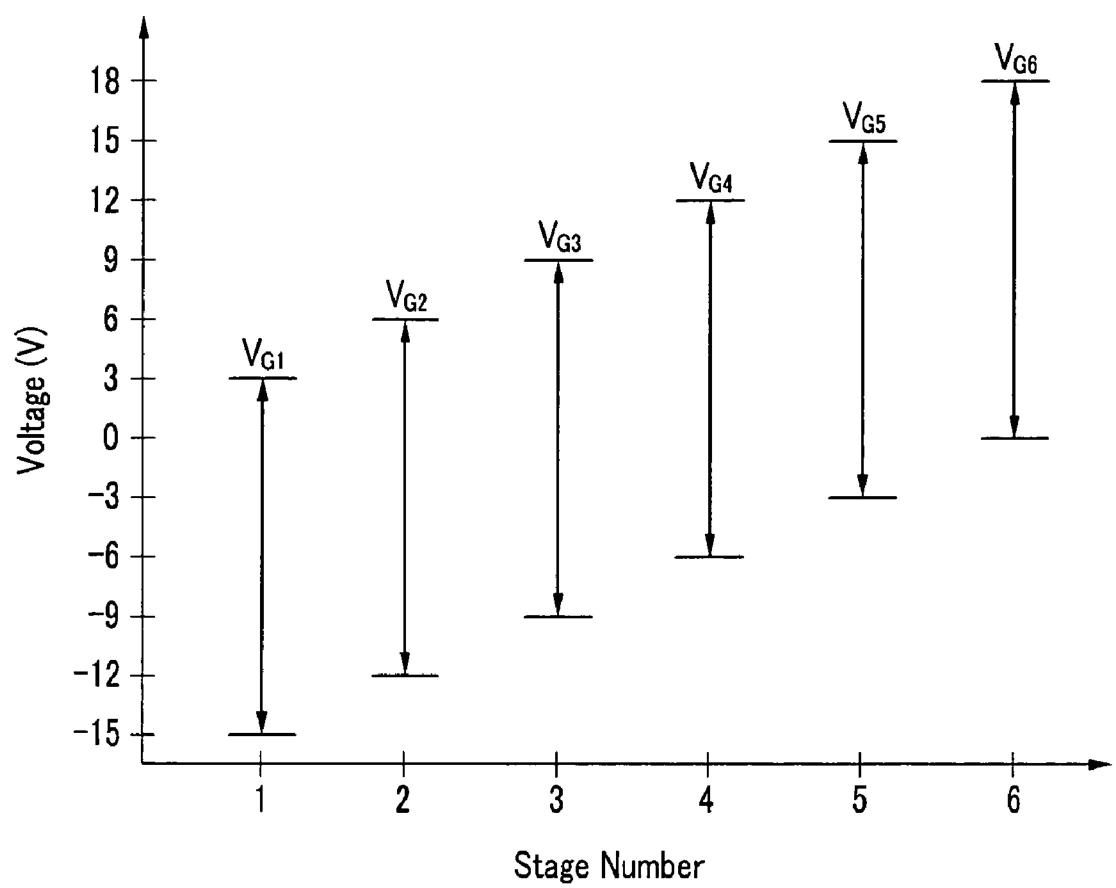
FIG. 4 is a diagram illustrating an exemplary embodiment of swing widths of voltages applied to the exemplary charge transfer transistors shown in FIG. 2.

FIG. 4 is a diagram illustrating an exemplary embodiment of swing widths of voltages applied to exemplary charge transfer transistors shown in FIG. 2.

For exemplary purposes only, it is assumed that the voltage Vcc is 3V and that there are 6 charge pumping stages.

Also for exemplary purposes only, the second charge pumping stage 432 among the charge pumping stages will be described.

According to a timing diagram of each clock signal shown in FIG. 3, a timing when a voltage $V_{G2}$ of G2 node swings is in the period 530. That is, the voltage $V_{G2}$ of G2 node swings when the voltage $V_{N2}$ of the N2 node (which is an output part of the second charge pumping stage 432) has a value of 2Vcc (=6V) which is not pumped because the clock signal CLKB is a low level.

Therefore, since the gate voltage $V_{G2}$ of the charge transfer transistor MP2 also becomes 2Vcc (=6V) by the turned-on swing transistor GP2 and the final output voltage $V_{OUT}$ is 6Vcc (=18V), the $V_{G2}$ voltage swings with an amplitude that has a maximum value of 2Vcc (=6V) and a minimum value of 2Vcc−6Vcc (=−12V).

The voltages $V_{G1}$ and $V_{G3}$ to $V_{G6}$ also behave similarly to the voltage $V_{G2}$. Although each voltage VG1 to VG6 has a different maximum value and a different minimum value, the swing widths are the same. In other words, the difference between the maximum value and the minimum value of each voltage VG1 to VG6 is the same.

In exemplary embodiments, a part having the largest power consumption in the DC-DC converter is generally a charge pump.

Power loss of the charge pump can be divided into conductive power consumption due to resistance components of the charge transfer transistor and switch power loss from switching gate voltages of the charge transfer transistor and the charge supply capacitor.

In above illustrated embodiments, by using the voltage level shifter 420, variation widths (swing widths) of voltages applied to the gate terminals of the charge transfer transistors MP1-MP6 are uniform.

Moreover, a gate voltage of the charge transfer transistor MP1-MP6 in each charge pumping stage 431-436 maximizes an absolute value of $V_{GS}$ of each charge transfer transistor MP1-MP6 by having a swing width of the final output voltage Vpp based on the input voltage $V_{IN}$ that is input by pumping. For example, the swing width of each voltage $V_{G1}$ to $V_{G2}$ is 18V, and the final output voltage Vpp is 18V.

Advantageously, resistance components of the charge transfer transistor may be reduced and switch power loss is not increased.

Figure 5:
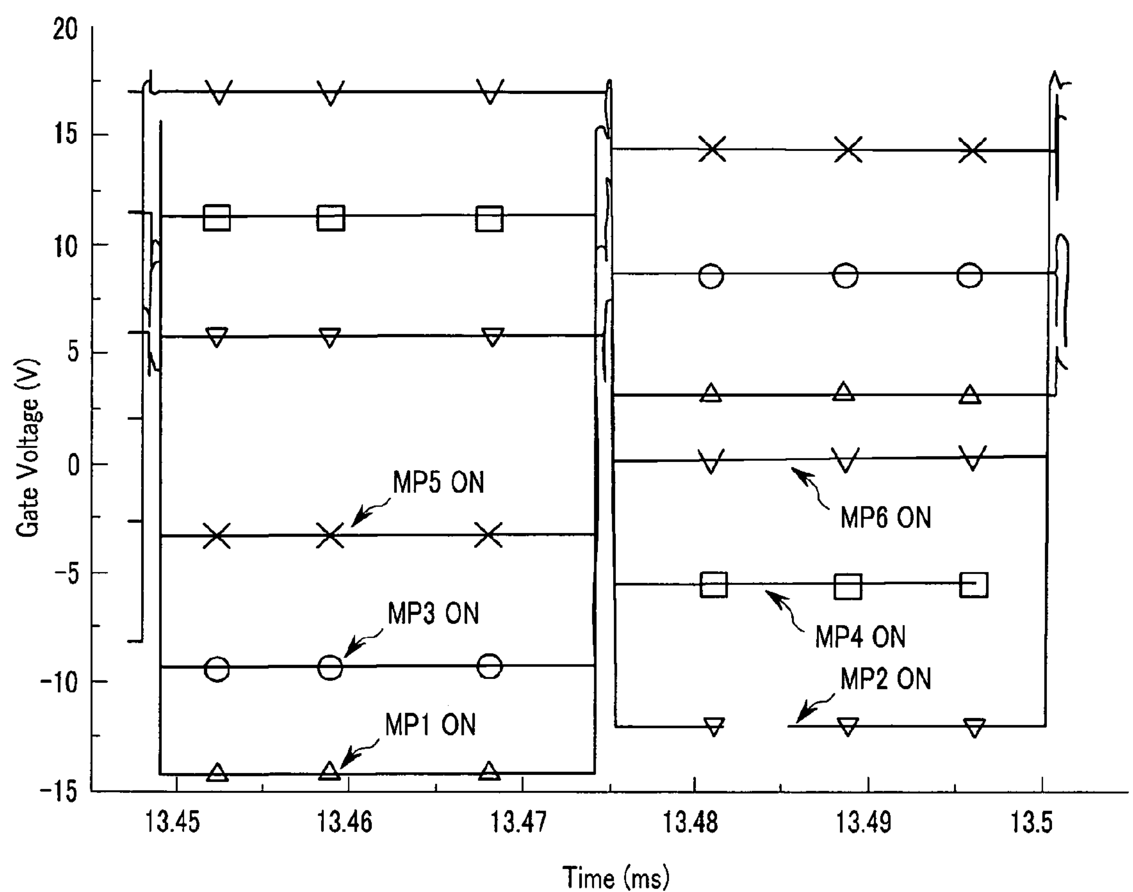
FIG. 5 is a diagram illustrating an exemplary embodiment of a variation of an output voltage of a voltage level shifter according to the present invention.

FIG. 5 is a diagram illustrating a variation of an output voltage of an exemplary voltage level shifter according to an exemplary embodiment of the present invention.

FIG. 5 shows the simulated result of a swing voltage width shown in FIG. 4.

Referring to FIG. 5, in a first period (approximately 13.45 ms to 13.475 ms), output voltages of the voltage level shifter 420 applied to gate terminals of the charge transfer transistors MP1, MP3, and MP5 of the odd-numbered charge pumping stages 431, 433, and 435 are approximately −12V, −6V, and 0V, respectively.

Since these values are smaller than voltages applied to each source terminal of the charge transfer transistors MP1, MP3, and MP5 of the odd-numbered charge pumping stages 431, 433, and 435, the charge transfer transistors MP1, MP3, and MP5 are turned-on during the first period.

During this same first period, output voltages of the voltage level shifter 420 applied to gate terminals of the charge transfer transistors MP2, MP4, and MP6 of the even-numbered charge pumping stages 432, 434, and 436 are approximately 6V, 12V, and 18V, respectively.

Since voltages applied to the gate terminals are a source voltage or higher, each of the charge transfer transistors MP2, MP4, and MP6 of the even-numbered charge pumping stages 432, 434, and 436 are turned-off during the first period.

In a second period (approximately 13.475 ms to 13.50 ms), an opposite situation occurs.

Output voltages of the voltage level shifter 420 that are applied to the gate terminals of the charge transfer transistors MP2, MP4, and MP6 of the even-numbered charge pumping stages 432, 434, and 436 are approximately −9V, −3V, and 3V, respectively.

Since these values are smaller than voltages applied to each source terminal of the charge transfer transistors MP2, MP4, and MP6 of the even-numbered charge pumping stages 432, 434, and 436, the charge transfer transistors MP2, MP4, and MP6 transistors are turned-on during the second period.

During the same second period, output voltages of the voltage level shifter 420 that are applied to the gate terminals of the charge transfer transistors MP1, MP3, and MP5 of the odd-numbered pumping stages 431, 433, and 435 are approximately 3V, 9V, and 15V, respectively.

Since voltages that are applied to the gate terminals are a source voltage or higher, each of the charge transfer transistors MP1, MP3, and MP5 of the odd-numbered charge pumping stages 431, 433, and 435 are turned-off during the second period.

Figure 6:
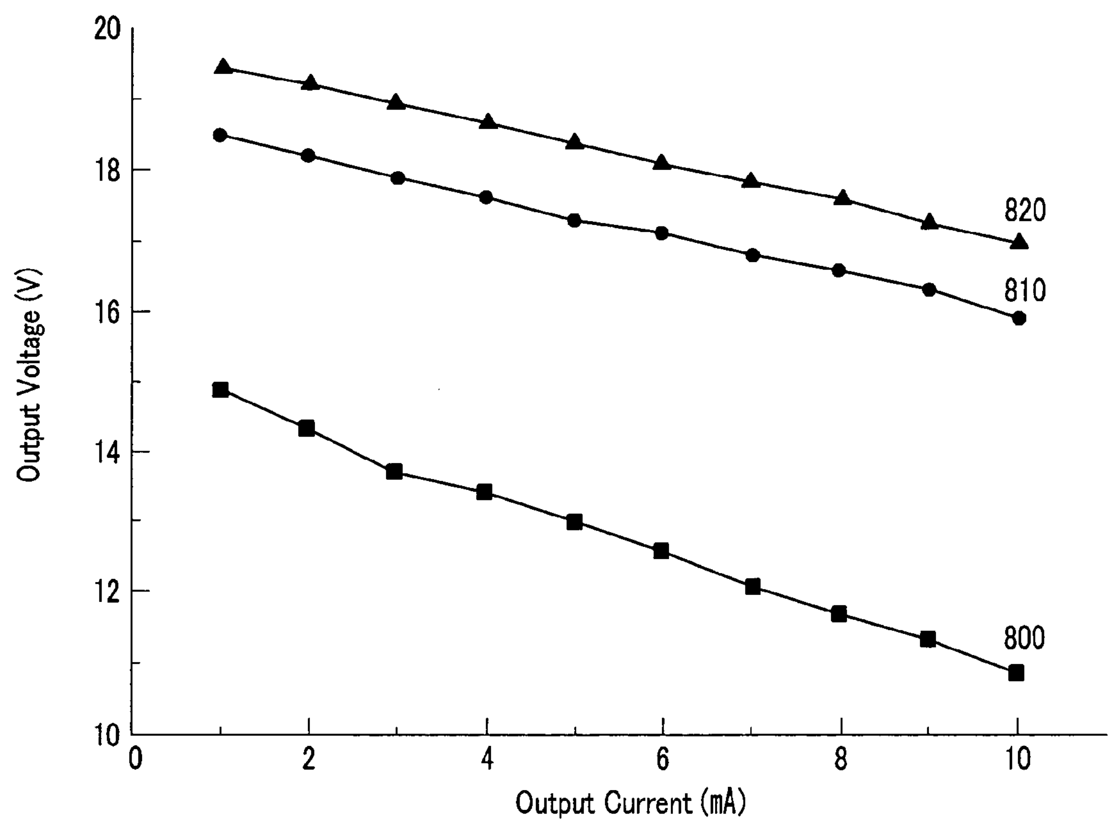
FIG. 6 is a graph illustrating an exemplary embodiment of variations of output voltages with respect to output currents of the prior art and the present invention; and, FIG. 7 is a graph illustrating an exemplary embodiment of variations power efficiency with respect to output currents of the prior art and the present invention.
Figure 7:
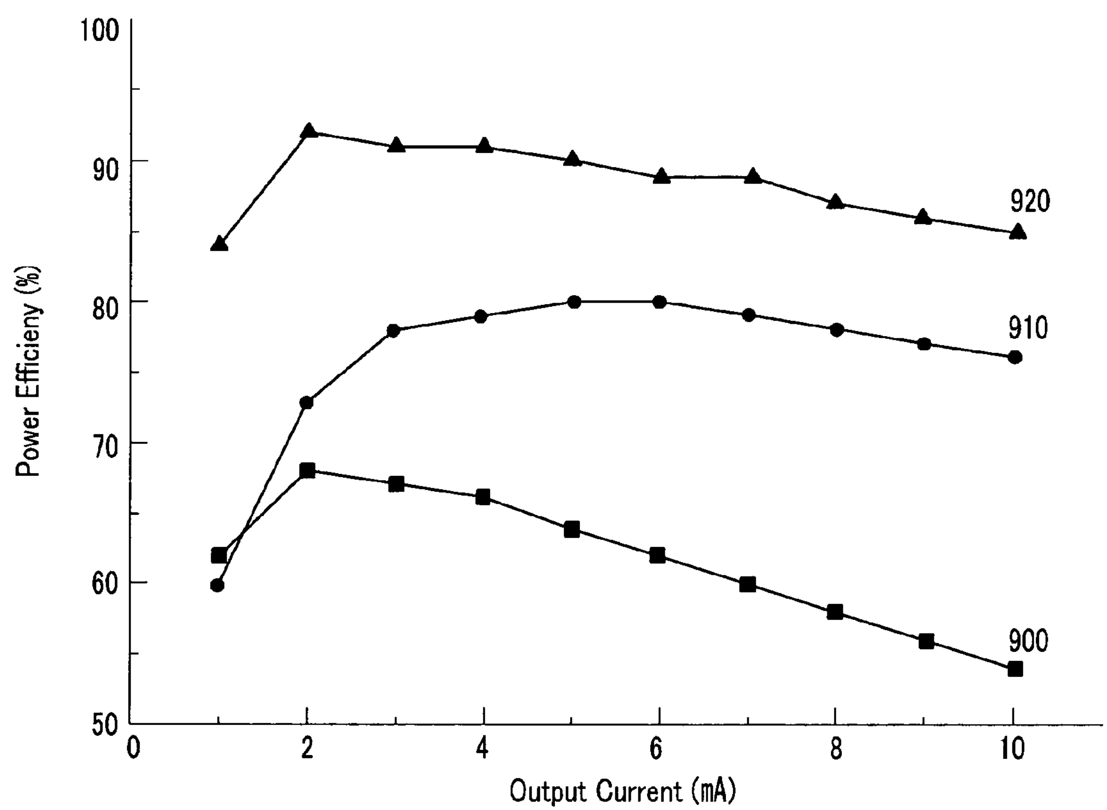

FIG. 6 is a diagram illustrating variations of output voltages with respect to output currents according to the prior art and an exemplary embodiment of the present invention and FIG. 7 is a diagram illustrating variations of power efficiency with respect to output currents according to the prior art and an exemplary embodiment of the present invention.

In FIG. 6, reference numeral 800 denotes a variation of an output voltage (V) with respect to an output current (mA) of a charge pump unit according to a first example of the prior art, reference numeral 810 denotes a variation of an output voltage (V) with respect to an output current (mA) of a charge pump unit according to a second example of the prior art, and reference numeral 820 denotes a variation of an output voltage (V) with respect to an output current (mA) of a charge pump unit according to an exemplary embodiment of the present invention.

Referring to FIG. 6, it can be seen that characteristics of the output voltage (V) with respect to the output current (mA) are gradually improved in the order of the first example of the prior art, the second example of the prior art, and the exemplary embodiment of the present invention.

In FIG. 7, reference numeral 900 denotes a variation of power efficiency (%) with respect to the output current (mA) according to a first example of the prior art, reference numeral 910 denotes a variation of power efficiency (%) with respect to the output current (mA) according to a second example of the prior art, and reference numeral 920 denotes a variation of power efficiency (%) with respect to the output current (mA) according to an exemplary embodiment of the present invention.

Power is represented by the product of a voltage and a current, and power efficiency is a value represented by a percentage (%) of (output power)/(input power).

The output power is represented by the product of an output voltage and an output current in a final output stage, and the input power is represented by the product of the input voltage and the input current in a first stage.

Referring to FIG. 7, it can be seen that excellent power efficiency (%) is obtained in a case 920 of using the charge pump unit 310 according to the exemplary embodiment of the present invention, compared with cases 900 and 910 of the prior art.

As described above, according to a charge pump unit of the present invention, as the voltage $V_{GS}$ is increased by maximizing a swing width of a voltage applied to a gate terminal of a charge transfer transistor of a charge pumping stage and the variation width of the voltage applied to the gate terminal of each charge transfer transistor is uniform, resistance components of a charge transfer transistor can be reduced.

Thereby, power loss is minimized and power efficiency is increased.

Furthermore, a low-power DC-DC converter according to the present invention can be applied to a display device that uses an organic light emitting device and a mobile display device by using a high efficiency charge pump.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A charge pump comprising:

an input terminal receiving an input voltage;

an output terminal outputting an output voltage;

a voltage level shifter shifting voltage levels of first and second gate clock signals so that received first and second gate clock signals output from the voltage level shifter have a predetermined amplitude, wherein the voltage level shifter receives the output voltage from the output terminal of the charge pump and shifts a voltage level so that amplitudes of the first and second gate clock signals become a magnitude of the output voltage; and a plurality of charge pumping stages connected in series between the input terminal and the output terminal, wherein each charge pumping stage comprises:

a charge transfer transistor transferring a voltage input to a first terminal to a second terminal, applying one of the first and second gate clock signals output from the voltage level shifter to a first gate terminal, and a level of a voltage transferred to the second terminal is a maximum level of the first and second gate clock signals output from the voltage level shifter; and a swing transistor including a second gate terminal connected to the first terminal of the charge transfer transistor, a third terminal of the swing transistor connected to the second terminal of the charge transfer transistor, and a fourth terminal of the swing transistor connected to the first gate terminal of the charge transfer transistor, and wherein a maximum value of a voltage applied to the first gate terminal of the charge transfer transistor drops to a minimum value of a voltage applied to the first gate terminal of the charge transfer transistor when one of the first and second gate clock signals output from the voltage level shifter is inverted from a high level to a low level.

2. The charge pump of claim 1, wherein odd-numbered charge pumping stages among the charge pumping stages are operated by responding to the first gate clock signal output from the voltage level shifter, and even-numbered charge pumping stages are operated by responding to second gate clock signal output from the voltage level shifter.

3. The charge pump of claim 1, wherein each charge pumping stage comprises:

a pumping capacitor connected between the second terminal of the charge transfer transistor and one of first and second pumping clock signals in a complementary state; and a swing capacitor connected between the first gate terminal of the charge transfer transistor and one of the first and second gate clock signals output from the voltage level shifter and having the predetermined amplitude.

4. The charge pump of claim 3, wherein the charge transfer transistor and the swing transistor are p-type metal oxide semiconductor transistors.

5. The charge pump of claim 3, wherein the first pumping clock signal and the first gate clock signal correspond to each other and are applied to a same charge pumping stage, and a low period of the first gate clock signal is included within a low period of the first pumping clock signal; and the second pumping clock signal and the second gate clock signal correspond to each other and are applied to a same charge pumping stage, and a low period of the second gate clock signal is included within a low period of the second pumping clock signal.

6. The charge pump of claim 1, wherein a swing width, defined by a difference between the maximum value and the minimum value of a voltage applied to the first gate terminal of the charge transfer transistor, is uniform for each charge pumping stage.

7. The charge pump of claim 6, wherein the swing width is substantially equal to a magnitude of the output voltage.

8. The charge pump of claim 6, wherein the plurality of charge pumping stages comprises n charge pumping stages, and the swing width is substantially equal to n times the input voltage.

9. The charge pump of claim 1, wherein the plurality of charge pumping stages comprises n charge pumping stages, and the output voltage is equal to n times the input voltage.

10. A DC-DC converter comprising:

a charge pump;

a signal generator generating first and second pumping clock signals and first and second gate clock signals; and a signal driver driving a swing transistor and a pumping capacitor of the charge pump connected thereto using the first and second pumping clock signals and the first and second gate clock signals, wherein the charge pump comprises an input terminal receiving an input voltage, an output terminal outputting an output voltage, a voltage level shifter shifting voltage levels of the first and second gate clock signals so that received first and second gate clock signals output from the voltage level shifter have a predetermined amplitude, wherein the voltage level shifter receives the output voltage from the output terminal of the charge pump and shifts a voltage level so that amplitudes of the first and second gate clock signals become a magnitude of the output voltage, and a plurality of charge pumping stages connected in series between the input terminal and the output terminal, wherein each charge pumping stage comprises:

a charge transfer transistor transferring a voltage input to a first terminal to a second terminal, applying one of the first and second gate clock signals output from the voltage level shifter to a first gate terminal, and a maximum level of the first and second gate clock signals output from the voltage level shifter is a level of a voltage that is transferred to the second terminal of the charge transfer transistor, and a swing transistor including a second gate terminal connected to the first terminal of the charge transfer transistor, a third terminal of the swing transistor connected to the second terminal of the charge transfer transistor, and a fourth terminal of the swing transistor connected to the first gate terminal of the charge transfer transistor, and wherein a maximum value of a voltage applied to the first gate terminal of the charge transfer transistor drops to a minimum value of a voltage applied to the first gate terminal of the charge transfer transistor when one of the first and second gate clock signals output from the voltage level shifter is inverted from a high level to a low level.

11. The DC-DC converter of claim 10, further comprising a voltage level detector outputting an enable signal to operate the signal generator when the output voltage does not reach a predetermined magnitude and outputting a disable signal so as to not operate the signal generator when the output voltage reaches the predetermined magnitude.

12. The DC-DC converter of claim 10, wherein odd-numbered charge pumping stages among the charge pumping stages are operated by responding to the first gate clock signal output from the voltage level shifter, and even-numbered charge pumping stages are operated by responding to the second gate clock signal output from the voltage level shifter.

13. The DC-DC converter of claim 10, wherein the charge transfer transistor and the swing transistor are p-type metal oxide semiconductor transistors.

14. The DC-DC converter of claim 10, wherein the first pumping clock signal and the first gate clock signal are applied to a same charge pumping stage, and a low period of the first gate clock signal is included within a low period of the first pumping clock signal; and the second pumping clock signal and the second gate clock signal are applied to a same charge pumping stage, and a low period of the second gate clock signal is included within a low period of the second pumping clock signal.

15. The DC-DC converter of claim 10, wherein a swing width, defined by a difference between a maximum value and a minimum value of a voltage applied to the first gate terminal of the charge transfer transistor, is uniform for each charge pumping stage.

* * * * *

UNITED STATES PATENT AND TRADEMARK OFFICE

CERTIFICATE OF CORRECTION

PATENT NO. : 7,706,159 B2
APPLICATION NO. : 11/442451
DATED : April 27, 2010
INVENTOR(S) : Kim et al.

It is certified that error appears in the above-identified patent and that said Letters Patent is hereby corrected as shown below:

Title Page, Item (73), Assignee, delete "Samsung Electronics Co., Ltd. (kr)" and insert therefor --Samsung Electronics Co., Ltd. (kr) and Industry-University Cooperation Foundation, Hanyang University (kr)--.

Signed and Sealed this

Fifth Day of October, 2010

David J. Kappos
*Director of the United States Patent and Trademark Office*